(12) United States Patent
Van Roosmalen

(10) Patent No.: US 10,254,041 B2
(45) Date of Patent: Apr. 9, 2019

(54) SYSTEM AND METHOD FOR PROCESSING A HYDROCARBON-COMPRISING FLUID

(71) Applicant: ILNG B.V., Oosterbeek (NL)

(72) Inventor: Jerom Ferdinandus Van Roosmalen, Oosterbeek (NL)

(73) Assignee: ILNG B.V., Oosterbeek (NL)

( * ) Notice: Subject to any disclaimer, the term of this patent is extended or adjusted under 35 U.S.C. 154(b) by 98 days.

(21) Appl. No.: 15/548,406

(22) PCT Filed: Feb. 3, 2016

(86) PCT No.: PCT/NL2016/050077
§ 371 (c)(1),
(2) Date: Aug. 2, 2017

(87) PCT Pub. No.: WO2016/126159
PCT Pub. Date: Aug. 11, 2016

(65) Prior Publication Data
US 2018/0266759 A1    Sep. 20, 2018

(30) Foreign Application Priority Data

Feb. 3, 2015  (NL) .................................. 1041168

(51) Int. Cl.
*F25J 3/06*   (2006.01)
*C10L 3/10*   (2006.01)

(52) U.S. Cl.
CPC .............. *F25J 3/061* (2013.01); *C10L 3/104* (2013.01); *C10L 3/106* (2013.01); *F25J 3/067* (2013.01);
(Continued)

(58) Field of Classification Search
CPC .......... F25J 3/061; F25J 3/067; F25J 2205/80; F25J 2210/04; F25J 2230/30;
(Continued)

(56) References Cited

U.S. PATENT DOCUMENTS 2,900,797 A    8/1959  Kurata et al.
3,312,073 A *  4/1967  Harmens ................ F25J 1/0022
                                                        62/54.1
(Continued)

FOREIGN PATENT DOCUMENTS

DE   2608680 A1   9/1976
EP   0463535 A1   1/1992
(Continued)

*Primary Examiner* — Frantz F Jules
*Assistant Examiner* — Lionel Nouketcha
(74) *Attorney, Agent, or Firm* — AEON Law, PLLC; Adam L. K. Philipp; Jonathan E. Olson

(57) ABSTRACT

Systems and methods for liquefying a gaseous fluid that comprises at least 50% by volume methane into a liquefied fluid that comprises at least 85% by volume methane. Processing can include increasing a pressure of the incoming gaseous fluid to between 10 and 50 bar; pre-treating the gaseous fluid using membrane filtering to a retentate stream having a methane content of at least 85% by volume; liquefying the retentate stream by cryogenic cooling to a temperature between −100° C. and −140° C.; flashing the liquefied fluid into a container; retrieving processed liquid fluid at a first container level at a pressure of between 1 and 10 bar, a temperature of between −120° C. and −160° C., and a methane concentration of at least 85% by volume into a storage device; and retrieving a slurry flow comprising solid CO2 and water ice at a second container level below the first container level.

7 Claims, 2 Drawing Sheets

(52) U.S. Cl.
CPC ....... *F25J 3/0635* (2013.01); *C10L 2290/548* (2013.01); *F25J 2205/20* (2013.01); *F25J 2205/80* (2013.01); *F25J 2210/04* (2013.01); *F25J 2210/66* (2013.01); *F25J 2230/30* (2013.01); *F25J 2245/02* (2013.01); *F25J 2270/90* (2013.01); *F25J 2290/12* (2013.01); *Y02C 10/12* (2013.01)

(58) Field of Classification Search
CPC .. F25J 2245/02; F25J 2290/12; F25J 2205/20; C10L 3/104; C10L 2290/548
See application file for complete search history.

(56) References Cited

U.S. PATENT DOCUMENTS

| | | | |
|---|---|---|---|
| 3,398,544 A * | 8/1968 | Crownover | C07C 7/14 |
| | | | 62/637 |
| 3,815,376 A * | 6/1974 | Lofredo | F25J 3/0209 |
| | | | 62/639 |
| 4,187,689 A | 2/1980 | Selcukoglu et al. | |
| 5,407,466 A | 4/1995 | Lokhandwala et al. | |
| 8,555,672 B2 * | 10/2013 | Turner | F25J 1/0022 |
| | | | 62/613 |
| 8,899,074 B2 * | 12/2014 | Wilding | F25J 1/0022 |
| | | | 62/532 |
| 10,151,528 B2 * | 12/2018 | Van Aken | F25J 1/0022 |
| 2007/0137246 A1 * | 6/2007 | McKellar | F25J 3/061 |
| | | | 62/620 |
| 2008/0156035 A1 * | 7/2008 | Aspelund | F25J 1/0027 |
| | | | 62/606 |
| 2011/0144407 A1 * | 6/2011 | Houtekamer | B01D 53/002 |
| | | | 585/818 |
| 2014/0130541 A1 * | 5/2014 | Malsam | C10L 3/10 |
| | | | 62/611 |

FOREIGN PATENT DOCUMENTS

| | | |
|---|---|---|
| EP | 2789957 A1 | 10/2014 |
| WO | 2009144277 A2 | 12/2009 |
| WO | 2012048078 A1 | 4/2012 |

* cited by examiner

SYSTEM AND METHOD FOR PROCESSING A HYDROCARBON-COMPRISING FLUID

FIELD OF THE INVENTION

The invention relates to a system and a method for processing, in particular for liquefying, an incoming hydrocarbon-comprising fluid.

BACKGROUND OF THE INVENTION

In general, many systems and methods processing hydrocarbon-containing fluid, in particular for liquefying hydrocarbon-comprising gas, are known. Often, an input fluid flow is used that comprises a highly purified gas. Often, such an input fluid flow is already dried, i.e., water vapour has been removed. Furthermore, often additionally carbon dioxide has been removed in a separate stage.

In many cases, however, the origin of a gas that needs to be liquefied has many sources. For instance, natural gas may originate from different wells. Another example is biogas, which usually has many different additional compounds in addition to methane.

U.S. Pat. No. 2,900,797 in 1959 already described the separation of normally gaseous acidic components and normally gaseous hydrocarbons. According to its description, in one aspect this invention relates to the purification of a methane stream containing carbon dioxide. In another aspect this invention relates to the removal of carbon dioxide from natural gas. Various normally gaseous hydrocarbon streams that contain methane as the major component also contain normally acidic components, such as carbon dioxide, in amounts which require the separation of such normally gaseous acidic components from the gas stream. It was found that operating a process according to this publication in practise was complex.

WO2014166925 of 2013 according to its abstract describes a method of liquefying a contaminated hydrocarbon-containing gas stream, the method comprising at least the steps of:
(a) providing a contaminated hydrocarbon-containing gas stream;
(b) cooling the contaminated hydrocarbon-containing gas stream in a first heat exchanger thereby obtaining a cooled contaminated hydrocarbon-containing stream;
(c) cooling the cooled contaminated hydrocarbon-containing stream in an expander thereby obtaining a partially liquefied stream;
(d) separating the partially liquefied stream in a separator thereby obtaining a gaseous stream and a liquid stream;
(e) expanding the liquid steam obtained in step (d) thereby obtaining a multiphase stream, the multiphase stream containing at least a vapour phase, a liquid phase and a solid phase;
(f) separating the multiphase stream in a separator thereby obtaining a gaseous stream and a slurry stream;
(g) separating the slurry stream in a solid/liquid separator thereby obtaining a liquid hydrocarbon stream and a concentrated slurry stream;
(h) passing the gaseous stream (80) obtained in step (d) through the first heat exchanger thereby obtaining a heated gaseous stream; and
(i) compressing the heated gaseous stream thereby obtaining a compressed gas stream; and
(j) combining the compressed gas stream obtained in step (i) with the contaminated hydrocarbon-containing gas stream provided in step (a).

The field is thus fully in motion and still seeking for process optimization.

Often, systems for liquefying gas, in particular gas comprising a large amount of methane, are designed for operation at a large industrial scale. Biogas, for instance, is usually produced in a decentralized way. Thus, there is in particular need for a gas treating and liquefying system that that offers freedom of design, in particular as to scale of design.

SUMMARY OF THE INVENTION

A disadvantage of prior art is that systems are provided that often are not or difficult to integrate. Some systems require a large infrastructure. Some or other systems require active components that require a relatively high amount of electrical power. Other gas treatment systems cannot meet the tight gas specifications as required at the inlet of the liquefaction system. The current system provides easy implementation.

Hence, it is an aspect of the invention to provide an alternative system that may be used next to or complementary to or in addition to known systems. This preferably further at least partly obviates one or more of above-described drawbacks.

The invention thus provides a method according to claim 1.

In an embodiment, the decanting device has a pressure-reducing device outlet for providing said fluid at a pressure of 1-10 bar, a decanting device inlet in fluid communication with said pressure-reducing device outlet and opening into a container, said decanting device for providing said liquefied fluid at a pressure of between 1 and 10 bar, a temperature of between −120° C. and −150° C., and a methane concentration of at least 98% by volume from said container at a decanting device outlet.

In an embodiment of the method, said pre-treatment comprising filtering said gaseous fluid using membrane filtering to a retentate with a pressure of between 10 and 50 bar, a temperature of between 0° C. and 50° C., a carbon dioxide content below 1% by volume, a water content below 10 ppm and a methane content of at least 95% by volume.

In an embodiment, said liquefying comprising cryogenic cooling said fluid to a temperature between −100° C. and −140° C. a pressure of between 10 and 50 bar and a methane content of at least 95% by volume;

In an embodiment, said flashing said liquefied fluid into a container comprises retrieving liquid fluid from said container at a first container level at a pressure of between 1 and 10 bar, a temperature of between −120° C. and −150° C., and a methane concentration of at least 98% by volume into a storage device and retrieving a slurry flow comprising solid $CO_2$ and water ice at a second container level below said first container level.

The system and method allow producing liquefied gas, in particular liquefied methane, at a relatively high purity.

The current system provides simple implementation by process integration of two unit operations that are individually known, but at different process conditions and not integrated at one process: membrane gas separation and cryogenic 3-phase separation. More particularly, flash gas from a cryogenic 3-phase separator is used as external sweep gas in one or more of the membrane modules. Sweep gas, also commonly called purge gas was found to enhance the gas separation in the membranes. In fact, the current process integration is the enabler to supply treated gas from the membrane retentate outlet, via a cold recovery exchanger, directly to the inlet of a standard gas liquefier.

In the current application, the pressure refers to the absolute pressure. In stead of "bar", in this context it is better to use the indication "bara". Thus, where in this application pressure is used, it refers to the absolute pressure.

The system and method in an embodiment are provided for receiving said incoming gaseous fluid at a pressure of between 1 and 30 bar and a temperature of between 0° C. and 50° C.

The system and method in an embodiment are provided for providing said outgoing fluid at a pressure of between 2 and 10 bar and a temperature of less than −120° C.

In an embodiment, the retrieving said liquid fluid is done at or above said first container level.

The process in the container is comparable to a decanting process where solid particles in a liquid are allowed to sink to the bottom of a container while at a higher level in the container liquid without solid particles is removed or poured out. This is also referred to as a 3-phase separator. It was found that relatively deep, evaporative cooling the fluid combined with decanting effectively removes for instance water ice and carbon dioxide ice without causing clogging. Here, cooling is largely achieved by partly evaporating the liquid, so-called flash cooling. The flashed-off vapor comprises mainly methane and nitrogen, with an extremely low concentration of CO2, and water and other contaminants due to the cryogenic conditions in the 3-phase separator.

Furthermore, when returning flash gas flows from the decanting and/or boil off gas from the storage and using it for instance for pre-cooling and/or as a sweep gas in membrane filtering, it provides an increasingly efficient process both in terms of energy usage and/or process effectiveness. As well as simplicity to operate.

Fluids comprising methane are often polluted with water, carbon dioxide and other components. For instance biogas has high concentrations of pollutions and differs in composition, even in one installation over time. This makes biogas often a less favourable fuel gas. The current system and method provide robust, scalable and/or energy efficient upscaling of for instance biogas.

In an embodiment, the system further comprises a storage device having a storage device inlet coupled to the decanting device outlet, a storage device outlet for the outgoing liquefied fluid.

In an embodiment, the storage device further comprises a boil off gas outlet for boil off gas from said storage device.

In an embodiment, the decanting device further comprises a container having a first container end and a second container end opposite said first container end, in use said first container end being an upper end and said second container end being a lower end, with said decanting device inlet comprising a decanting device inlet end opening inside said container at a distance from said first container end and at a distance from said second container end.

In an embodiment, the slurry-residue outlet opens at or near said second end.

In an embodiment, the decanting device outlet opens near a container wall near a level of said decanting device inlet end.

In an embodiment, the container comprises a weir provided between a level of said decanting device inlet end and said first container end, and said decanting device outlet opening at said weir for retrieving liquefied fluid overflowing said weir.

In an embodiment, the container further comprises a flash gas outlet for flash gas at or near said first container end.

In an embodiment, the flash gas outlet is fluidly-coupled for providing fluid communication to at least one selected from a pre-cooler in said liquefying device for pre-cooling said fluid before it is provided to said cryogenic cooler, to a permeate side of said membrane separator for removing permeate, and said compression device inlet.

In an embodiment, the flash gas outlet is fluidly coupled to an inlet of a pre-cooler in said liquefying device for pre-cooling said fluid before it is provided to said cryogenic cooler. Said flash gas can subsequently be provided to a permeate side of at least one of said membrane separator for removing permeate. Said flash gas can subsequently be provided to said compression device inlet.

In an embodiment, the boil off gas outlet from the storage device is fluidly coupled for providing fluid communication to at least one selected from a pre-cooler in said liquefying device for pre-cooling said fluid before it is provided to said cryogenic cooler, to a permeate side of said membrane separator for removing permeate, and said compression device inlet.

In an embodiment, the boil off gas outlet is in fluid coupled to an inlet of a pre-cooler in said liquefying device for pre-cooling said fluid before it is provided to said cryogenic cooler, said boil off gas is subsequently provided to a permeate side of at least one of said membrane separator for removing permeate, and said boil off gas is subsequently provided to said compression device inlet.

In an embodiment of the method, the flashed fluid, comprising vapor, liquid and solid phases, is released into said container below a fluid level of said liquid fluid. In an embodiment of the method, the incoming fluid is a biogas.

In an embodiment of the method, the fluid coming from the pre-treatment device contains at least 0.1% by volume $CO_2$.

In an embodiment of the method, a slurry-residue stream is retrieved from said container. In particular, this stream contains at least 50% by weight of solid $CO_2$ particles.

In an embodiment of the method, a flash gas stream is retrieved from said container. In particular, said flash gas stream is retrieved above said first container level.

In an embodiment, a stream of boil-off gas is retrieved from said storage device, and if available said flash gas stream. Said flash gas stream, said boil-off stream, or a combination thereof are provided in heat exchanging contact with said fluid upstream, for instance before said cryogenic cooling.

In an embodiment of the method, the flash gas, said boil off gas or a mixture thereof is provided to said membrane filtering as a sweep gas at a lower pressure or permeate side in said membrane filtering.

In an embodiment of the method, the slurry-residue stream is warmed, melted and evaporated, and subsequently combined with the said incoming fluid.

In an embodiment, the method and system require one compressor device for boil off gas, flash gas, the incoming gaseous fluid, and the slurry stream.

The pre-treatment device comprising a membrane separator. In an embodiment, suitable membrane separators and membranes are discussed in the article 'Future Directions of Membrane Gas Separation' by Richard W. Baker, Ind. Eng. Chem. Res. 2002, 41, 1393-1411. This article is cited by reference as if fully set forth. In an embodiment, the membrane separator comprises at least two membrane devices that are functionally coupled in series to provide two stages. The two membrane devices may differ. In an embodiment, membrane filtration is based on the 'hollow-fibre type' made of a polymer, for example polyimide. The components present in the gas (methane, carbon dioxide, nitrogen, water and others) permeate through a very thin selective layer based on a 'solution-diffusion' process. The selectivity of the membrane separation is a result of the different permeability of the components The system may comprise a compression device for compressing of said incoming gaseous fluid to a pressure between 10 and 50 bar at an compression device outlet. Usually, the compression device comprises a first compressor, an intercooler, and a second compressor. This configuration and suitable compressors are as such known to a skilled person.

The 3-phase separator or decanting device comprises a pressure-reducing device. The decanting device further comprises a decanting device inlet. In the system, the decanting device inlet is in fluid communication with said pressure-reducing device outlet. The decanting device further comprises a decanting device outlet. The decanting device further comprises a slurry-residue outlet for providing a slurry flow comprising solid $CO_2$ and water ice. The decanting device further comprising a container. The decanting device inlet enters the container at or near one end of the container. The slurry-residue outlet is provided in the container at a position remote from the decanting device inlet. In an embodiment, the decanting device inlet enters the container at or near one end of the container. In use this end is the upper end or upper part of the container. The slurry-residue outlet in an embodiment is provided at or near an opposite end of the container, in use this is referred to as the lower end or lower part of the container.

In an embodiment, the container walls are insulated. In particular, the container or at least part of the container form at least part of a Dewar.

The decanting device inlet extends into the container. It thus reaches into the container. The decanting device inlet has a decanting device inlet end. In an embodiment, it opens at a distance from a container wall.

The decanting device outlet is provided opening in said container between the one end and the opposite end. In an embodiment, the decanting device outlet is provided opening near a wall of the container. In an embodiment, the decanting device outlet is provided opening near the decanting device inlet end.

The container further comprises a headspace or vapor space room in said container. The headspace room is positioned at the one end of the container. In use it was already referred to as the upper end or upper part of the container. The decanting device inlet in an embodiment reaches into the headspace room. The headspace room comprises an headspace room outlet end that opens to the opposite end. The headspace room allows flash gas to be allowed to leave the container with a minimum amount or without entraining solid particles or liquid drops. The decanting device inlet end in an embodiment opens at or near the headspace room outlet end.

In an embodiment, the decanting device comprises a gas inlet, opening in the headspace room.

In an embodiment, the decanting device further comprises a gas outlet, opening in the headspace room. The gas from the gas outlet is referred to as flash-gas.

In an embodiment, the container further comprises an internal liquid overflow or weir near, at or above a level of said decanting device inlet end, with decanting device outlet opening in said overflow.

In an embodiment, the container comprises a conical part having its narrowest cross section at of near the slurry-residue outlet. In an embodiment, the decanting device inlet end opens at of above a largest cross section of the conical part. The conical part allows settling particles, in particular of a larger diameter, to move towards the decanter slurry-residue outlet.

In operation, in an embodiment the decanting device is first partially filled with liquid up to past the headspace outlet end. In an embodiment, the container is filled via said decanting device inlet up to a level above the decanting device inlet end. In an embodiment the container is filled using a system or method start-up flow of incoming fluid.

The system may further comprise a control subsystem. In an embodiment the control subsystem comprises a series of control units. A control unit is functionally coupled to at least one sensor for determining a physical parameter selected from pressure, temperature, flow, liquid level, and a combination thereof. A control unit is further functionally coupled to at least one selected from a valve, a compressor, a heater, and a pressure reducer.

For the devices described, an outlet is 'in fluid communication' with in inlet of another device, of it is 'fluidly coupled'. This in general means that a line of one device is connected to a line of another device, and that a fluid, i.e. a gas or a liquid, can flow through the connected lines from one device to another. It should be clear that such a connection does not need to be a direct connection. For instance valves may be included, allowing a line to be closed. Other, further devices may also be included in the line.

The liquefying device comprises a cryogenic cooler, also referred to as 'cryo cooler'. Such a cryogenic cooler is in general provided for cooling and condensing an incoming fluid to a temperature of between −70° C. and −200° C. as an output fluid flow. Such cryogenic cooler may be engineered for providing an output fluid that may have a pressure of up to 15 bar. In the current invention, in particular a cryogenic cooler is used for providing a fluid that allows an output temperature of between −80° C. and −150° C. and at a pressure of between 5 and 30 bar. In the art, the term 'cryogenic' is often defined in reference to temperatures below −150° C. (or below about 120K). In the scientific world, 'cryogenic' is often used when referring to temperature below −180° C. (93.15K). This is the boiling point of 'permanent gasses'.

In engineering, 'cryogenic' is often used when equipment or devices or parts are used that allows gasses to be processes to above-references conditions. This does not always mean that the devices or parts are actually used at these low temperatures.

In the current invention, a broad definition is used.

A suitable cryogenic cooler that was found in particular useful was a cryogenic cooler using the Stirling cycle. These types of cryogenic coolers are also referred to as Stirling gas liquefier. An example is a Stirling gas liquefier that is marketed by Stirling Cryogenics, a trade name of DH Industries B.V.

In an embodiment, the invention provides an integrated process for upgrading the incoming gaseous fluid, for instance biogas, by subsequent compression, membrane gas treatment, followed by liquefaction, pressure reduction and subsequent vapour-liquid separation as well as removal of solid impurities within one 3-phase separator, also referred to as a decanter-flash vessel or decanter device.

In an embodiment, boil off gases from the storage tank, caused by heat input, can be combined with the flash gas from the 3-phase separator of the decanter device. The mixed stream at low pressure can then be returned to the feed. In this way, boil-off gas from the storage tank can be directed to the feed compression device instead of using a dedicated, additional boil-off gas compressor. Such a boil-off gas compressor has an expensive design for handling cryogenic temperatures. It allows use of only one compressor in the system, i.e., in the compression device for compressing the incoming gaseous liquid.

In an embodiment, the liquid-solid (slurry) bottom stream or slurry residue output from the 3-phase separator containing the contaminants in solid phase can be melted, vaporised, superheated if necessary, and then combined with the incoming fluid, for instance feed-biogas.

The recycling of flash gas may cause a high nitrogen content in the recycle, which high nitrogen content is a common phenomenon at LNG plants. This may have a negative effect on the liquefaction efficiency. Therefore, a bleed can be included, which can limit the accumulation of nitrogen. The nitrogen-rich bleed in an embodiment can be used as a fuel gas for gas engines or other gas consumers.

In an embodiment, liquefaction is done at or slightly below the pressure of the retentate outlet of the membrane separator. In an embodiment, in this way the temperature of liquefaction can be maximised. In this way, the risk of contaminant freeze-out can be reduced. A higher pressure can also improve the efficiency of the liquefaction process.

In an embodiment, recycling of flash gas, in an embodiment mixed with boil-off gas, can be done by providing the recycled gas to a suction inlet of the membrane feed gas compressor. The recycled, dry and cold flash gas has to be heated prior to mixing with the relatively wet biogas and therefore the recycle can include cold recovery at the cryogenic cooler.

The flash gas can have a low pressure and can be dry and have a very low $CO_2$ content. In an embodiment, the flash gas is used as sweep gas at a permeate side of one or more of the membranes of the membrane separator. The flash gas or sweep gas can thus dilute the permeate and can allow significant reduction the partial pressure of contaminants like water and $CO_2$ on the low pressure permeate side. This dilution can increase the driving force across the membrane and improves the flux of $CO_2$ and water through the membrane to the permeate side. The flash gas used as sweep gas also reduces the co-permeation of product gas. A lower concentration of $CO_2$ and water at the outlet of the membrane separator can reduce the risk of freeze-out and can also allow further sub-cooling. This can significantly improve the efficiency of the liquefaction at the liquefying device.

The invention further pertains to system for processing an incoming gaseous fluid comprising at least 50% by volume methane, said system provided for an outgoing fluid comprising a methane content of at least 98% by volume, said system comprising:

a compression device provided for compressing of said incoming gaseous fluid to a pressure between 10 and 50 bar at a compression device outlet, said compression device comprising a compression device inlet for receiving said incoming fluid;

a pre-treatment device comprising a membrane separator for separating $CO_2$ and water from said incoming fluid, said pre-treatment device comprising a pre-treatment device inlet in fluid communication with said compression device outlet, said pre-treatment device for providing said fluid as a retentate at a pressure of between 10 and 50 bar, a temperature of between 0° C. and 50° C., a carbon dioxide content below 2% by volume, a water content below 10 ppm by volume and a methane content of at least 95% by volume at a pre-treatment outlet;

a liquefying device comprising a liquefying device inlet in fluid communication with said pre-treatment device inlet, said liquefier comprising a cryogenic cooler provided for cooling and condensing said fluid to a temperature of between −100° C. and −140° C., a pressure of between 10 and 50 bar, and a methane content of at least 95% by volume at a liquefier outlet, and a decanting device comprising a pressure-reducing device having a pressure-reducing device inlet in fluid communication with said liquefying device outlet and having a pressure-reducing device outlet for providing said fluid at a pressure of 2-10 bar, a decanting device inlet in fluid communication with said pressure-reducing device outlet and opening into a container, said decanting device for providing said liquefied fluid at a pressure of between 2 and 10 bar, a temperature of between −120° C. and −150° C., and a methane concentration of at least 98% by volume from said container at a decanting device outlet, said decanting device further comprising a slurry-residue outlet in said container for providing a slurry flow comprising solid $CO_2$ and water ice.

The invention further pertains to a method for processing a gaseous fluid, said method comprising:

providing an incoming gaseous fluid comprising at least 50% by volume methane;

increasing a pressure of said incoming gaseous fluid to between 10 and 50 bar;

pre-treating said gaseous fluid with increased pressure, said pre-treatment comprising filtering said gaseous fluid using membrane filtering to a retentate with a pressure of between 10 and 50 bar, a temperature of between 0° C. and 50° C., a carbon dioxide content below 2% by volume, a water content below 10 ppm by volume and a methane content of at least 95% by volume;

liquefying said pre-treated fluid, said liquefying comprising cryogenic cooling said fluid to a temperature between −100° C. and −140° C., a pressure of between 10 and 50 bar, and a methane content of at least 95% by volume;

flashing said liquefied fluid into a container, retrieving liquid fluid from said container at a first container level at a pressure of between 2 and 10 bar, a temperature of between −120° C. and −150° C. and a methane concentration of at least 98% by volume into a storage device and retrieving a slurry flow comprising solid $CO_2$ and water ice at a second container level below said first container level.

The invention further or alternatively pertains to a system for liquefying an incoming gaseous fluid comprising at least 50% by volume methane, said incoming fluid at a pressure of between 1 and 30 bar at a temperature of between 0° C. and 50° C., into an outgoing liquefied fluid comprising a methane content of at least 98% by volume at a pressure of between 2 and 10 bar and a temperature of less than −120° C., said system comprising:

a pre-treatment device comprising a membrane separator for separating at least one gas not being methane from said incoming fluid, said pre-treatment device comprising a pre-treatment device inlet in fluid communication with said compression device outlet, said pre-treatment device for providing said fluid as a retentate at a pressure of between 10 and 50 bar, a temperature of between 0° C. and 50° C. and a methane content of at least 95% by volume at a pre-treatment outlet;

a liquefying device comprising a liquefying device inlet in fluid communication with said pre-treatment device outlet, said liquefier comprising a cryogenic cooler for cooling and condensing said fluid to a temperature of between −100° C.

and −140° C., a pressure of between 10 and 50 bar and a methane content of at least 95% by volume at a liquefier outlet, and a decanting device comprising a pressure-reducing device having a pressure-reducing device inlet in fluid communication with said liquefying device outlet and having a pressure-reducing device outlet for providing said fluid at a pressure of 2-10 bar, a decanting device inlet in fluid communication with said pressure-reducing device outlet, a decanting device outlet providing said liquefied fluid at a pressure of between 2 and 10 bar, a temperature of between −120° C. and −150° C. and a methane concentration of at least 98% by volume, said decanting device further comprising a slurry-residue outlet for providing a slurry flow comprising solid particles not being methane.

The invention further provides liquefied natural gas, obtainable by the method according to the invention.

The invention further provides liquefied natural gas, obtainable using the system according to the invention.

The term "substantially" herein, like in "substantially consists", will be understood by and clear to a person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

The term "functionally" will be understood by, and be clear to, a person skilled in the art. The term "substantially" as well as "functionally" may also include embodiments with "entirely", "completely", "all", etc. Hence, in embodiments the adjective functionally may also be removed. The term "functionally" is intended to cover deviations in a feature to which it refers which are such that in the functional use of the feature in combination with other features it relates to in the invention, the combination of features is able to operate.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices or apparatus herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device or apparatus claims enumerating several means, several of these means may be embodied by one and the same item of hardware. The mere fact that certain measures are recited in mutually different dependent claims does not indicate that a combination of these measures cannot be used to advantage.

The invention further applies to an apparatus or device comprising one or more of the characterising features described in the description and/or shown in the attached drawings. The invention further pertains to a method or process comprising one or more of the characterising features described in the description and/or shown in the attached drawings.

The various aspects discussed in this patent can be combined in order to provide additional advantages. Furthermore, some of the features can form the basis for one or more divisional applications.

BRIEF DESCRIPTION OF THE DRAWINGS

Embodiments of a liquefying system will now be described, by way of example only, with reference to the accompanying schematic drawings in which corresponding reference symbols indicate corresponding parts, and in which.

The drawings are not necessarily on scale.

DESCRIPTION OF PREFERRED EMBODIMENTS

Figure 1:
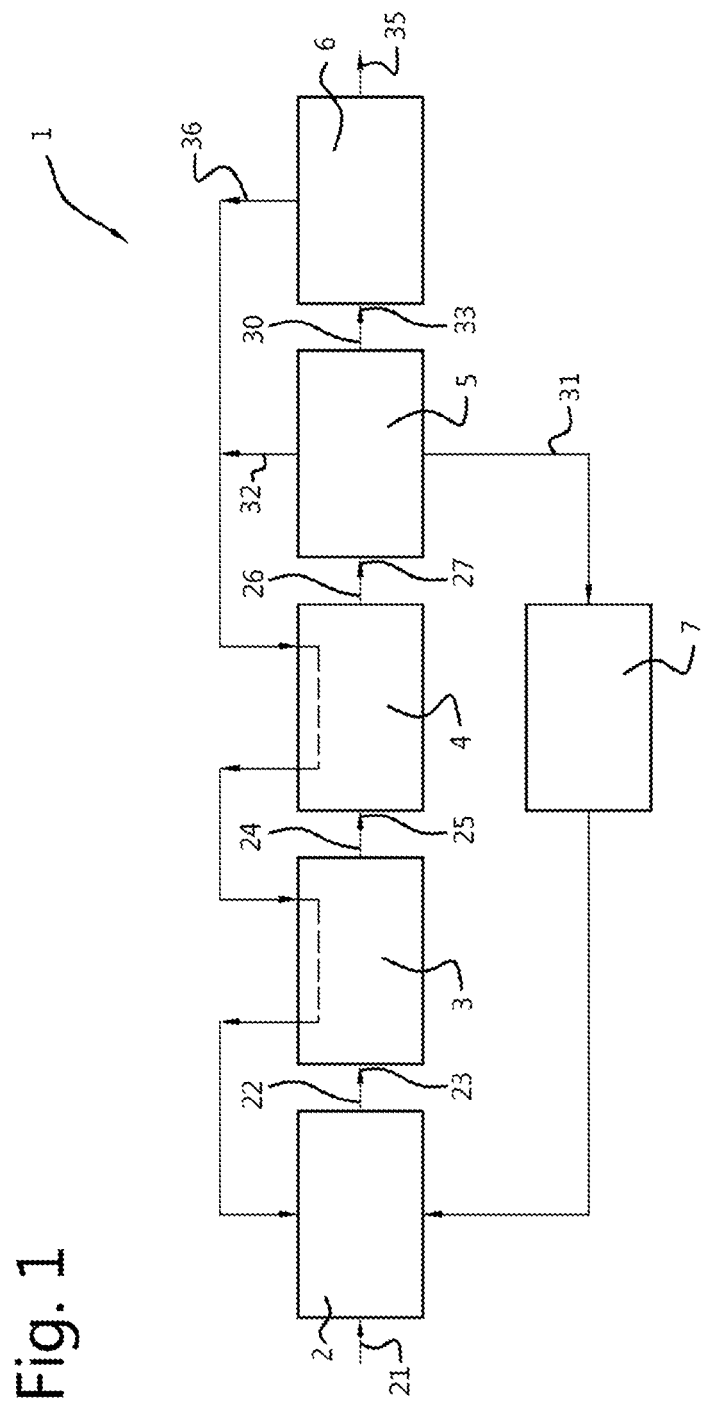
FIG. 1 schematically a high level overview of an embodiment of an integrated gas treatment and liquefying system.

FIG. 1 schematically depicts a system according to an aspect of the invention on a high abstraction level. The system comprises a compression device 2, a pre-treatment device 3, a liquefying device 4, a decanting device 5, a storage device 6. In an embodiment it further comprises a melting and conditioning device 7. These devices may comprise further apparatus and couplings as will be explains when discussing FIG. 2 which shown a system in more detail.

The compression device 2 comprises a compression device inlet 21 for receiving said incoming fluid, and a compression device outlet 22.

The pre-treatment device 3 comprises a pre-treatment device inlet 23, and a pre-treatment device outlet 24.

The liquefying device 4 comprises a liquefying device inlet 25 and a liquefying device outlet 26.

The decanting device 5 comprises a decanting device inlet 27, a decanting device outlet 30, a slurry-residue outlet 31, and a flash gas outlet 32 for flash gas.

The storage device 6 comprises a storage device inlet 33, a storage device outlet 35, and a boil off gas outlet 36. In a storage, the liquid can warm up a and a small amount of gas will form in the storage device. This gas is referred to as boil off gas.

Both the boil off gas and the flash gas are relatively clean and cold. In the system of FIG. 1, both these gas flows are in counterflow used in the system. They are thus directed and used upstream in the system or the method. For instance, as shown in FIG. 1, the gasses are first used to pre-cool incoming gas entering the liquefying device 5. Next, the still relatively clean gasses are directed upstream to the pre-treatment device 3. There, it can be used as a sweep gas for a membrane separator (shown in FIG. 2).

Figure 2:
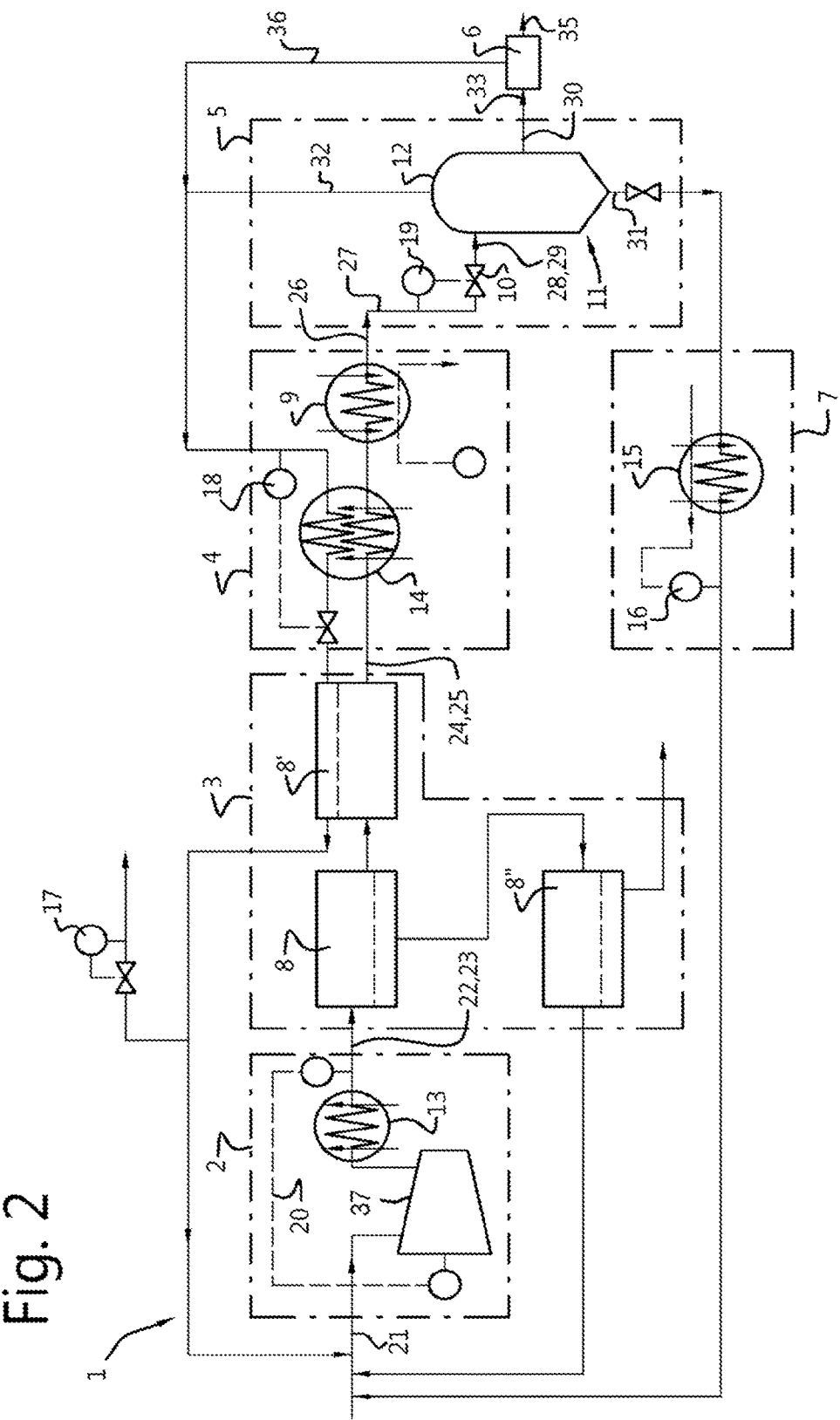
FIG. 2 schematically shows a liquefying system in more detail.

FIG. 2 shows the abstract system schedule of FIG. 1 in more detail. The devices of FIG. 1 are indicated with dashed lines. FIG. 2 explains that each of the devices of FIG. 1 may comprise various apparatus of devices or controllers. In FIG. 2, some valves (two equal-sided triangles with touching apexes) are included in the devices, but valves may also be provided between devices.

The compression device 2 in FIG. 2 comprises one compressor 37 and an air cooler 13 for cooling the outlet gas from the compressor 37. In an embodiment, the compression device comprises a first and second compression stage, and an intercooler between the compression stages. The compression device in this embodiment further comprises a pressure controller 20. This pressure controller controls operation, for example the rotational speed, of the compressor 37, and has a pressure sensor at the compression device outlet 22. This in order to provide the pre-treatment device 3 with the proper pressure.

The pre-treatment device 3 comprises in the embodiment of FIG. 2 three membrane separators 8, 8' and 8". Membrane separators 8 and 8' are placed in series. The compressed incoming gas is first provided at an to the membrane separator 8. The retentate of membrane separator 8 is provided to a second membrane separator 8'. The retenate of membrane separator 8' is here provided to the pre-treatment device outlet 24.

The permeate of the first membrane separator 8 is provided to a third membrane separator 8". The retentate of the third membrane separator 8" is recirculated to the compression device inlet 21. The permeate is removed from the system. It is rich in $CO_2$ and may be liquefied in a separate system, of freed into the atmosphere. The permeate from the second membrane separator 8' may be recirculated to the compression device inlet 21. It may also or alternatively exit the system as bleed gas for instance as fuel gas or for power generation.

The liquefying device 4 comprises in this embodiment a pre-cooler 14. This pre-cooler 14 is here a heat exchanger that uses flash gas and/or boil off gas from flash gas outlet 32 or boil off gas outlet 36. The liquefying device 4 further comprises a cryogenic cooler 9.

The decanting device 5 in the embodiment of FIG. 2 comprises first a pressure reducer 10 for flashing gas into the decanting device inlet 28. The decanting device comprises a decantor 11 comprises a container 12 into which the decating device inlet 28 opens at a decating device inlet end. The container 12 further comprise a flash gas outlet 32 for letting off flash gas. The container 12 further comprises the decanting device outlet 30, the slurry-residue outlet 31. Here, the slurry-residue outlet 31 is provided with a valve, for instance a time-based valve. It is to be noted that under normal operating conditions, the amount of ice and carbon dioxide ice will be relatively low compared to the amount of methane, for instance.

In operation, the system may operate as follows. An incoming gaseous fluid usually comprises at least 50% by volume methane, have a pressure of between 1 and 30 bar and a temperature of between 0° C. and 50° C. First, the pressure of the incoming fluid is increased to a pressure between 10 and 50 bar. Using an intercooler, usually the temperature does not increase significantly. Usually, the temperature will remain between 0° C. and 50° C.

Next, the fluid is subjected to a pre-treatment step using membrane filtration. Here, large part of the water and carbon dioxide is removed. It was found that removing these components at this stage largely increases the process efficiency. The carbon dioxide content usually will be below 2% by volume, in particular below 1% by volume. A water content will usually below 10 ppm by volume. A methane content will usually be at least 85% by volume at a pre-treatment outlet, in particular at least 95% by volume. In fact, the pre-treatement device or membrane device comprise an inlet and an outlet for treated gas fluidly coupled to the liquefying device inlet. Furthermore, the pre-treatment device comprises an inlet for flash gas/sweep gas and an outlet for the flash gas/sweep gas. This is provided at the permeate side(s) of the membrane(s).

Next, the fluid will be liquefied. Here a cryogenic cooler, for instance a Stirling cryogenic cooler is used. Now that large part of the water and carbon dioxide are already removed, this can be done without detrimental effects end efficiently. Usually, cooling and condensing said fluid is done to a temperature of between −100° C. and −140° C., and a pressure of between 10 and 50 bar.

Next, the liquefied, pressurized fluid is subjected to a decanting step. The fluid is flashed into a container. Usually, the fluid is released below a level of already-present liquid methane. Because of the low temperature, the ice and carbon dioxide will show minimal flocculation and sink to the bottom of the container into which the fluid is flashed. At or just below a liquid level, purified methane will be retrieved. At or near the bottom of the container, a slurry of largely ice and carbon dioxide ice will collect and be removed. Please note that this stream or flow will be relatively limited. Now, the fluid will have a pressure of between 2 and 10 bar (depending on the inlet pressure), a temperature of between −120° C. and −150° C. and a methane concentration of at least 85% by volume, in particular at least 98% by volume.

Below is a table showing typical values of input gas and output gas that results from a system of the invention. The levels of $N_2$ and $O_2$ will be higher when there is no bleed from the flash gas and boil off gas from the recycle loop.

TABLE

Example of typical gas compositions for a system used as an integrated Biogas Treating and Liquefaction unit with raw biogas feed from Anaerobic Digester

| | Biogas as incoming fluid | Gas at pre-treatment device outlet | Liquefied Gas in storage |
|---|---|---|---|
| $CH_4$ | 55-70 mol % | 90-99 mol % | 98-99 mol % |
| $CO_2$ | 30-45 mol % | 0.1-2.0 mol % | 0.05 mol % |
| $N_2$ | 0.2 mol % | 0.4 mol % | 0.4 mol % |
| $O_2$ | <0.1 mol % | <0.2 mol % | <0.2 mol % |
| $H_2O$ | Saturated | 1-3 ppm mol | <1 ppm mol |
| Siloxanes | <15 mg/Nm$^3$ | <15 mg/Nm$^3$ | <100 ppb mol |

Experimental Example

The current experiment was conducted at a biomass-digester site, setup for scientific studies, which produces about 50 Nm$^3$/hr of raw biogas. The biogas is normally converted into electricity by a Combined Heat & Power (CHP) unit. A standard 20 ft container, with a 3-stage membrane system to upgrade the biogas for injection into a natural gas grid was used for the experiment. The unit is designed to produce a retentate outlet stream containing about 2 mol % $CO_2$ and a water dewpoint of about −70° C. at a pressure of 15 bar.

First Stage

Firstly, the standard membrane unit was modified by adding a 4th membrane stage, which reduced the $CO_2$ concentration in the outlet stream to 0.1 mol % (1000 ppm), with about 3% nitrogen and 96 mol % (bio) methane. This stream was liquefied at a pressure of 15 bar by a standard, 1 cylinder Stirling cryocooler. The liquid methane was subsequently letdown to a pressure of 3 bar in a 3-phase separator. Solid $CO_2$ settled at the conical bottom of the 3-phase separator, which was visible through a Storz endoscope. Solid $CO_2$ could be removed from the vessel by briefly opening of the bottom valve, which was recorded with a camera fitted on the endoscope. The flash gas from the 3-phase separator showed an extremely low $CO_2$ concentration of <50 ppm. This stream was recycled via a modified CNG compressor to the feed and the rotational speed of the compressor controlled the pressure in the 3-phase separator.

A clean Liquefied Bio Methane (LBM) stream was produced, containing about 0.06 mol % $CO_2$. Gas compositions were measured by a 4-stream Gas Chromatograph, type ABB NGC8206. The above-mentioned equipment, including auxiliaries like cooling water chillers and evaporators were installed in a standard 20 ft container, located next to the 20 ft container with the membrane equipment.

Second Phase

During the second phase of the experiment, the previously installed 4th stage membrane modules were removed, equivalent to a reduction of total membrane area by about 40%. In fact, the standard 3-stage membrane line-up was restored. Besides, a new process connection was made between the 2 containers, by flowing the flash gas from the cryogenic 3-phase separator to the permeate side of the 2nd stage membrane. This so-called sweep gas line-up was commissioned and was capable of handling all the flash gas coming from the 3-phase separator, which was visible as a constant pressure in the 3-phase separator of 3 bar and the flash gas recycle (modified CNG) compressor stopped completely. The standard membrane unit was capable of upgrading the raw biogas to biomethane, which contained only about 0.05 mol % of $CO_2$. This gas proved to be suitable for liquefaction with only small amounts of solid $CO_2$ settling in the 3-phase separator.

Table below provides an overview of the results of the experiment

|  | 1st phase of experiment | 2nd phase of experiment |
|---|---|---|
| Configuration of membrane unit | 4-stage | 3-stage |
| Fash gas to sweep gas line-up | No | Yes |
| Total membrane area installed | 100% | 60% |
| $CO_2$ concentration at outlet of membrane unit (=inlet of liquefier) | 0.1 mol % | 0.05 mol % |
| Flash gas line-up | Recycle to liquefier | Sweep gas to membrane |
| Flash gas compressor running | Yes | No |
| $CO_2$ content in Liquid Bio Methane | 0.06 mol % | 0.05 mol % |

Thus during the 2nd phase of the experiment with a smaller installed membrane, it was possible to remove the flash gas compressor and still get a lower $CO_2$ content with less solid $CO_2$ in the 3-phase separator.

It will also be clear that the above description and drawings are included to illustrate some embodiments of the invention, and not to limit the scope of protection. Starting from this disclosure, many more embodiments will be evident to a skilled person. These embodiments are within the scope of protection and the essence of this invention and are obvious combinations of prior art techniques and the disclosure of this patent.

REFERENCE NUMBERS 1 liquefying system
2 compression device
3 pre-treatment device
4 liquefying device
5 decanting device
6 storage device
7 melting and conditioning device
8, 8', 8" membrane separator
9 cryogenic cooler
10 pressure reducer
11 decantor
12 container
13 air cooler
14 pre-cooler
15 heater
16 temperature controller for heater
17 pressure controller for bleed gas
18 pressure controller for flash gas outlet
19 level controller for line feeding the pressure reducer
20 pressure controller for membrane separator
21 compression device inlet
22 compression device outlet
23 pre-treatment device inlet
24 pre-treatment outlet
25 liquefying device inlet
26 liquefier outlet
27 pressure-reducing device inlet
28 pressure-reducing device outlet
29 decanting device inlet
30 decanting device outlet
31 slurry-residue outlet
32 flash gas outlet
33 storage device inlet
35 storage device outlet
36 boil off gas outlet
37 compressor

The invention claimed is:

1. A method for processing a gaseous fluid, said method comprising:

providing an incoming gaseous fluid comprising at least 50% by volume methane;

increasing a pressure of said incoming gaseous fluid;

liquefying a stream derived from the pressurized gaseous fluid, said liquefying comprising cryogenic cooling said stream to liquefied fluid having a temperature between −100° C. and −140° C., a pressure of between 10 and 50 bar, and a methane content of at least 85% by volume;

flashing said liquefied fluid into a container, retrieving from said container:
 a processed liquid fluid at a first container level at a pressure of between 1 and 10 bar, a temperature of between −120° C. and −160° C. and a methane concentration of at least 85% by volume,
 a slurry flow comprising solid $CO_2$ and water ice at a second container level below said first container level, and
 a flash gas stream at a level above said first container level;

characterized in increasing said pressure of said incoming gaseous fluid to between 10 and 50 bar;

before liquefying said stream derived from the pressurized gaseous fluid, pre-treating said gaseous fluid with increased pressure, said pre-treatment comprising filtering said gaseous fluid using membrane filtering to a retentate with a pressure of between 10 and 50 bar, a temperature of between 0° C. and 50° C., a carbon dioxide content of between 0.1-2% by volume, a water content below 10 ppm by volume and a methane content of at least 85% by volume, said retentate being the stream derived from the pressurized gaseous fluid that is liquefied;

providing said flash gas stream to said membrane filtering as a sweep gas at a permeate side in said membrane filtering; and retrieving the processed liquid from the container into a storage device.

2. The method of claim 1, wherein said flashed fluid is released into said container below a fluid level of said liquid fluid.

3. The method of claim 2, wherein said incoming fluid is a biogas.

4. The method according to claim 1, wherein a slurry-residue stream is retrieved from said container which contains at least 50% by weight of solid $CO_2$ particles.

5. The method according to claim 4, wherein said slurry-residue stream is warmed, melted and evaporated, and subsequently combined with said incoming gaseous fluid.

6. The method according to claim 1, wherein a stream of boil-off gas is retrieved from said storage device, and said flash gas stream, said boil-off stream, or a combination thereof are provided in heat exchanging contact with said fluid before said cryogenic cooling.

7. The method according to claim 6, wherein said boil off gas or a mixture of said boil-off gas and said flash gas is provided to said membrane filtering as a sweep gas at a lower pressure and permeate side in said membrane filtering.

* * * * *